a feed stroke adjustable to the diameter of its end convolution.

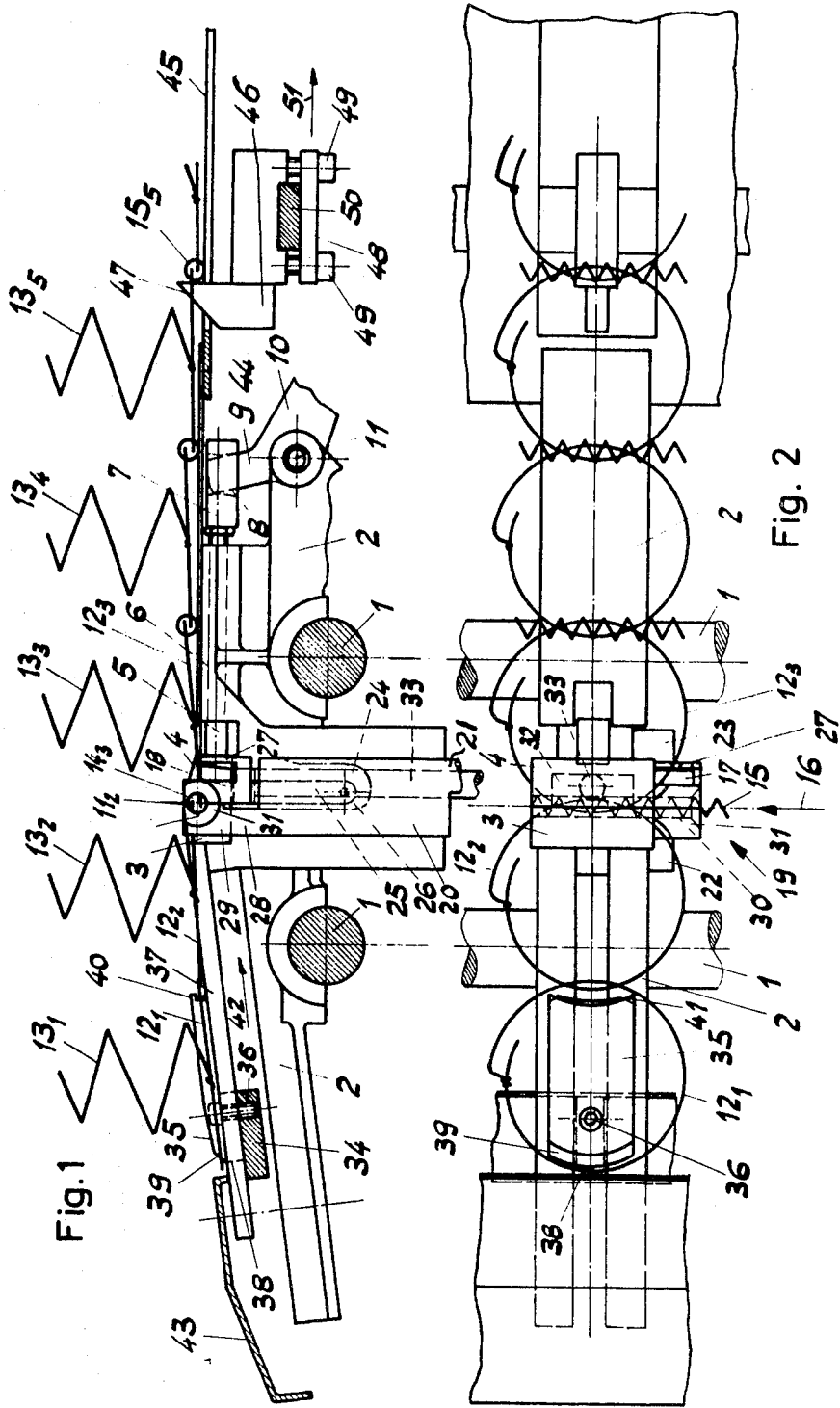

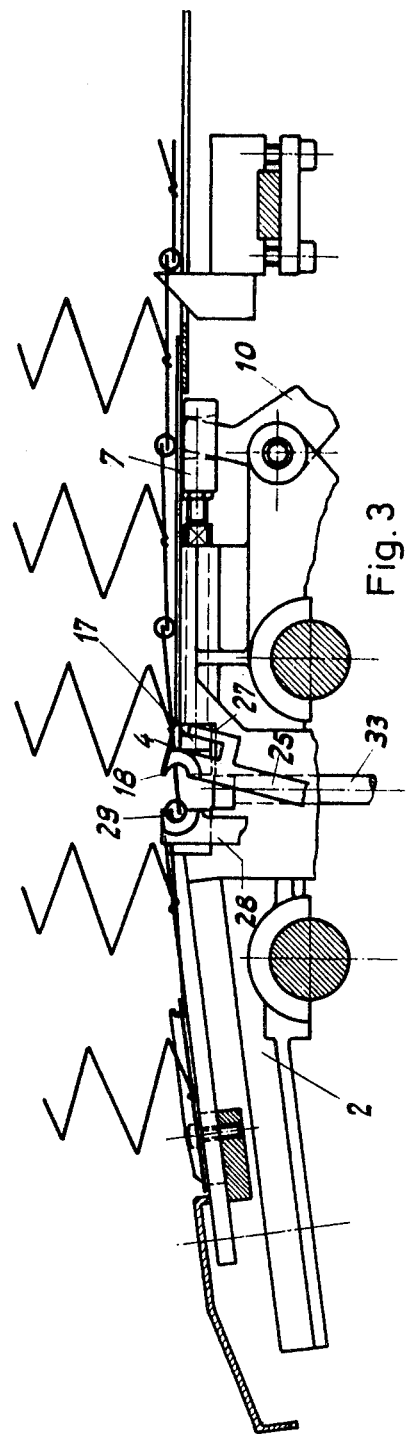

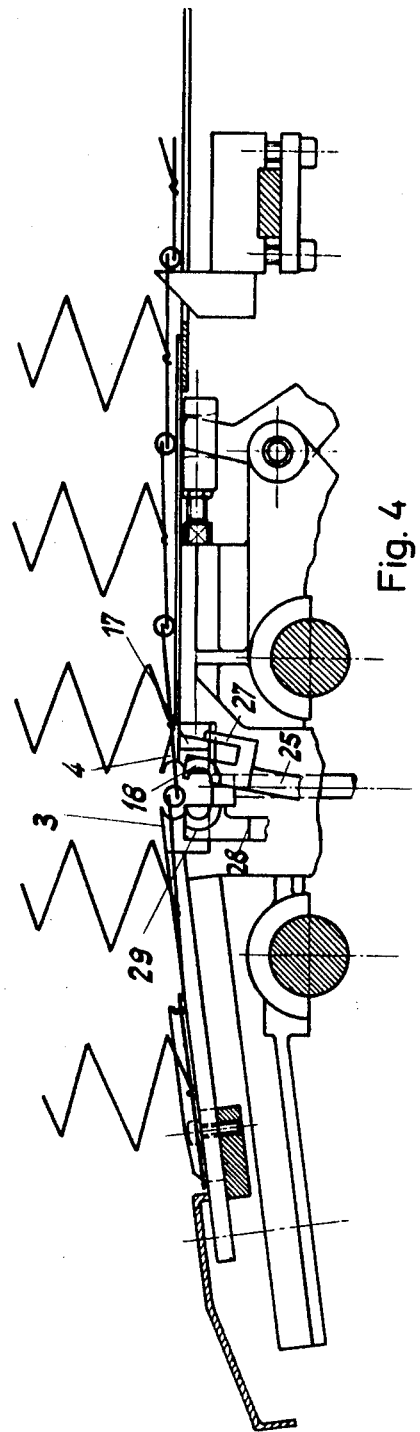

United States Patent Office 3,516,451
Patented June 23, 1970

3,516,451
MACHINES FOR MANUFACTURING SPRING INTERIORS
Walter Spühl, St. Gall, Switzerland, assignor to Spühl A.-G., St. Gall, Switzerland
Filed Mar. 3, 1967, Ser. No. 620,369
Claims priority, application Germany, July 12, 1966, S 104,755
Int. Cl. F21f 21/00, 45/00
U.S. Cl. 140—92.8                                    2 Claims

ABSTRACT OF THE DISCLOSURE

A machine for manufacturing spring interiors comprises a loading device which feeds adjacent rows of coil springs to symmetrical rows of pairs of tongs where the end convolutions of adjacent springs are joined together by a wire spiral, the feed stroke of the loading device being adjustable to the diameter of the spring end convolutions.

---

Figure 5:
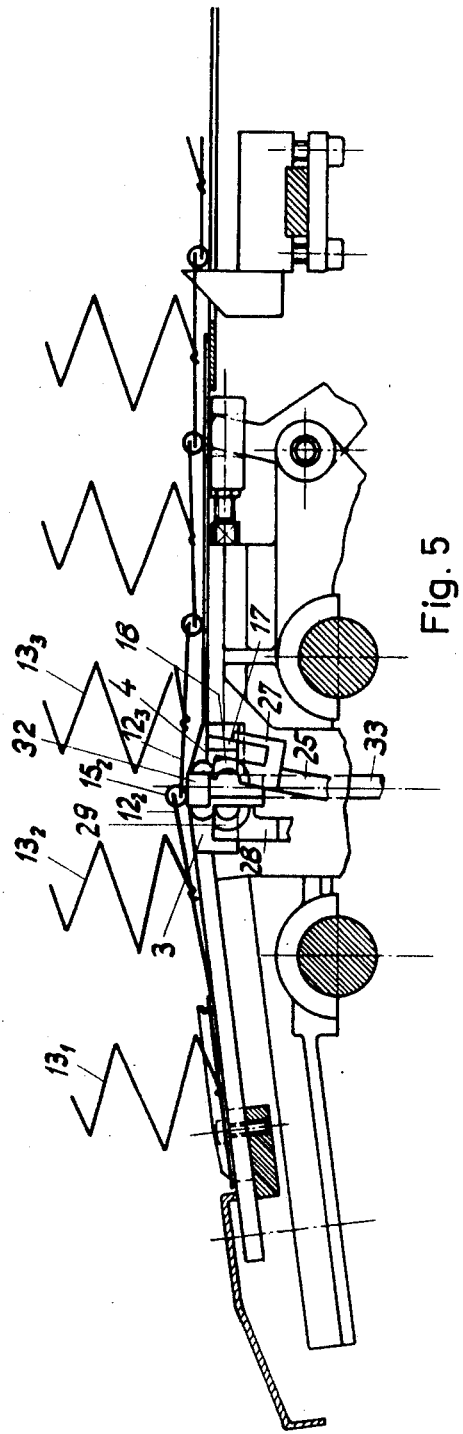

The present invention relates to machines for manufacturing spring interiors from coil springs which are arranged in a row between two symmetrical rows of tongs provided on the machine, so that the end convolutions of adjacent springs, located in pairs of tongs, may be connected together by wire spirals, wherein the machine has a loading device for a row of springs which are simultaneously moved by the amount of a feed stroke adjustable to the diameter of the end convolution, for the purpose of bringing them into the tongs.

A machine of this kind is described in British Pat. No. 994,803. In this known machine each pair of tongs is mounted on an individual tongs carrier, and the loading device has on each tong body an abutment relative thereto, and an individual conveying mechanism for the spring having one of its end convolutions laid on the abutment. The conveying mechanism comprises, inter alia, a toothed rack driven by a pinion, and a wire accommodated in a longitudinal slot in the toothed rack, which wire has a bent-up end serving to ensure that a spring winding falls accurately into the tongs during the common feed movement of all the springs in the loading device. The common feed movement is effected by a shaft on which are mounted the pinions of the above-mentioned conveying mechanisms, the angle of rotation of the shaft being adjustable to correspond to the diameter of the end convolutions of the springs. This known loading device is very complicated and expensive, and it takes a long time to change over to springs having end convolutions of different diameter, since each of the above-mentioned abutments has to be adjusted individually. Furthermore, the machine is not suitable for high operating speeds, since faults may then occur, and the loading device cannot be used to load the first two rows of springs. The first two rows of springs have to be laid in the tongs manually. After the spring body has been manufactured, the last springs have to be lifted out of the tongs manually, in order to push the spring body out of the machine. An object of the invention is to avoid these disadvantages by providing a machine which operates rapidly, is simple to operate and adjust to different sizes of springs, and is economical to manufacture.

According to the present invention a machine for manufacturing spring interiors is provided with two symmetrical rows of pairs of tongs, a loading device for feeding a spring into each pair of tongs, such that the end convolutions of adjacent springs located in the tongs may be connected together by a wire spiral, the loading device for each pair of rows of tongs having a traverse which is provided with a cam for each pair of tongs, each of said cams serving to center an end convolution of a spring and each end of the traverse being releasably connected to a feed element having an adjustable stroke such that each spring is moved by the loading device by the amount of a feed stroke adjustable to the diameter of its end convolution.

The invention will be further described, by way of example, with reference to the accompanying drawing, in which:

FIG. 1 is a sectional side elevation of part of a machine for manufacturing spring bodies constructed according to the present invention, FIG. 2 is a plan view of the machine of FIG. 1; and FIGS. 3 to 6 are views each corresponding to FIG. 1, illustrating the machine in a different operating position.

A machine illustrated in the drawing is provided with two rigidly mounted transverse rods 1 on which is mounted a row of tongs carriers 2 of which only one is illustrated in the drawing. A jaw 3 of a pair of tongs is rigidly mounted on the tongs carrier 2, and a mating tong jaw 4 is mounted on the front end of a rod 5, which rod 5 is displaceable in a bearing 6 provided in the tongs carrier 2. The rear end of the rod 5 has a head 7 provided with a slot 8 into which engages an arm 9 of a lever 10 pivotably mounted at 11 on the tong carrier 2. The lever 10 is pivoted back and forth (by means not illustrated) in synchronism with the machine, in order to open and close the pair of tongs 3, 4. The pair of tongs 3, 4 is constructed such that a front portion $11_2$ of a lower end convolution $12_2$ of a coil spring $13_2$, and a rear portion $14_3$ of a lower end convolution $12_3$ of a coil spring $13_3$, may be picked up thereby for joining together by a wire spiral $15_2$ when the tongs 3, 4 are closed, the wire spiral $15_2$ being screwed forward in the direction of the arrow 16. An arrangement constructed as a mirror image of the arrangement illustrated in FIG. 1 is provided thereabove, in order to join together in a similar manner the upper end convolutions (not shown) of the coil springs $13_2$ and $13_3$.

A projection 17 is provided on the displaceable jaw 4 which projection 17 on entry of the end convolution of the spiral $15_2$, serves to swivel a jaw 18 of a wire spiral guiding device 19 connected in series with the pair of tongs 3, 4. The wire spiral guiding device 19 has a prismatic body 20 mounted on the upper end of a rod 21 which is movable up and down, the prismatic body 20 being guided between two guide rails 22 and 23 provided on the tongs carrier 2. The body 20 has a recess 24 in which an arm 25 is pivotably mounted at 26, which arm 25 carries the jaw 18 and a laterally staggered, upwardly directed abutment 27 which cooperates with the projection 17 of the movable tong jaw 4. A shorter arm 28 extends upwards from the body 20, on which arm 28 is rigidly mounted a jaw 29 which, in the operating position of the wire spiral guiding device 19 illustrated in FIGS. 1 and 2, forms with the jaw 18 a cylindrical guiding passage 30 for the wire spiral $15_2$, which guiding passage 30 is in alignment with the inside diameter of the pair of tongs 3, 4 and preceded by a conically widened inlet guide 31.

An extractor 32, which is omitted in FIG. 1 and illustrated as being rectangular in the plan view of FIG. 2, is located below the pair of tongs 3, 4, which extractor 32 is attached to the upper end of a rod 33 which is movable up and down, said extractor 32 serving to extract from the pair of tongs 3, 4 the end convolution portions $11_2$ and $14_3$ joined together by the spiral $15_2$.

A row of centering cams 35 is attached by screws 36 to a traverse 34 extending across the entire length of the transverse rod 1. One centering cam 35 is provided for each pair of tongs 3, 4 and slides on two rails 37 provided on the tongs carrier 2. The rear of the centering cam 35 is defined by a convex, narrow side 38 whose radius is adapted to the radius of the lower end convolution $12_1$ of the spring $13_1$ to be centered, the centering cam 35 being conically chamfered on its convex side at 39. The front of the centering cam 35 is defined by a concave, slightly overhanging narrow side 40 whose corners 41 serve for the centering of the spring. The ends of the traverse 34 are releasably attached to the pistons of two pneumatic cylinders (not shown) by means of which the traverse 34 is movable in the direction of arrow 42, by an adjustable amount from the initial position shown in FIG. 1, in order to bring the spring $13_1$ into the position of the spring $13_2$. The traverse 34 and its centering cams 35 together with the corresponding mirror image traverse and its centering cams, form a feeding device which is loaded manually with a row of the springs $13_1$ to be handled, while the machine is operating.

If springs having a different end convolution radius are to be handled, the entire traverse 34, with the centering cams attached thereto and adapted to the new radius, is interchanged and the corresponding new stroke is set in the direction of the arrow 42. In order to effect this interchange, a narrow, inclined, rigidly mounted guide table 43 located in front of the traverse 34 and serving to push the springs $13_1$ on to the centering cams 35, is temporarily removed. Despite this, the changing-over of the machine to springs having a different end convolution diameter takes substantially less time than with known spring interior forming machines. Furthermore, the centering cams 35 retain the springs $13_1$ in a defined position.

A table 44 having a row of slots 45 is provided at the rear of the machine and serves to convey the rows of springs which have been connected together. A dragging member 46 projects through each slot 45 and has a front, chamfered edge 47. In FIG. 1 there is shown a sire spiral $15_5$ which has been conveyed to edge 47 during the return movement of the dragging member 46. The dragging member 46 is attached to a traverse 50 by retaining portion 48 and screws 49. The ends of the traverse 50 are attached to conveying elements movable in the direction of the arrow 51 and actuated by the same pneumatic cylinders and pistons as the traverse 34, wherein the stroke of the traverse 50 may also be adapted to the end convolution diameter of the springs.

The method of operation of the machine described will now be explained with reference to FIGS. 3 to 6. When the operator has loaded the springs $13_1$ into the loading device 34, 35 he activates the machine for an operating cycle, for example by means of a pedal. During this operating cycle the springs $13_1$ are to be connected to the springs $13_2$, while the end convolutions $12_2$ and $12_3$ of the springs $13_2$ and $13_3$ located in the pair of tongs 3, 4 have already been joined together by the spiral $15_2$ during the previous operating cycle. The head 7 of the rod 5 is first of all drawn away from the tongs by swivelling the lever 10 about its pivot 11, the movable jaw 4 thus being brought into its open position illustrated in FIG. 3. The tong jaw projection 17 thus swings the arm 25 of the wire spiral guiding device 19 via the abutment 27, so that the jaws 28 and 29 are opened. The prismatic body 20 of the wire spiral guiding device 19 is now drawn downwards by the rod 21, whereby the two wire spiral guide jaws 29 and 18 are brought into the position illustrated in FIG. 4 in which they are located in a lower position than the jaws 3 and 4. The two pairs of jaws 29, 18 and 3, 4 are thus opened, so that upward movement of the rod 33 causes the extractor 32 to extract from the pair of tongs 3, 4 the end convolutions $12_2$ and $12_3$ joined together by the spiral $15_2$, as shown in FIG. 5.

Figure 6:
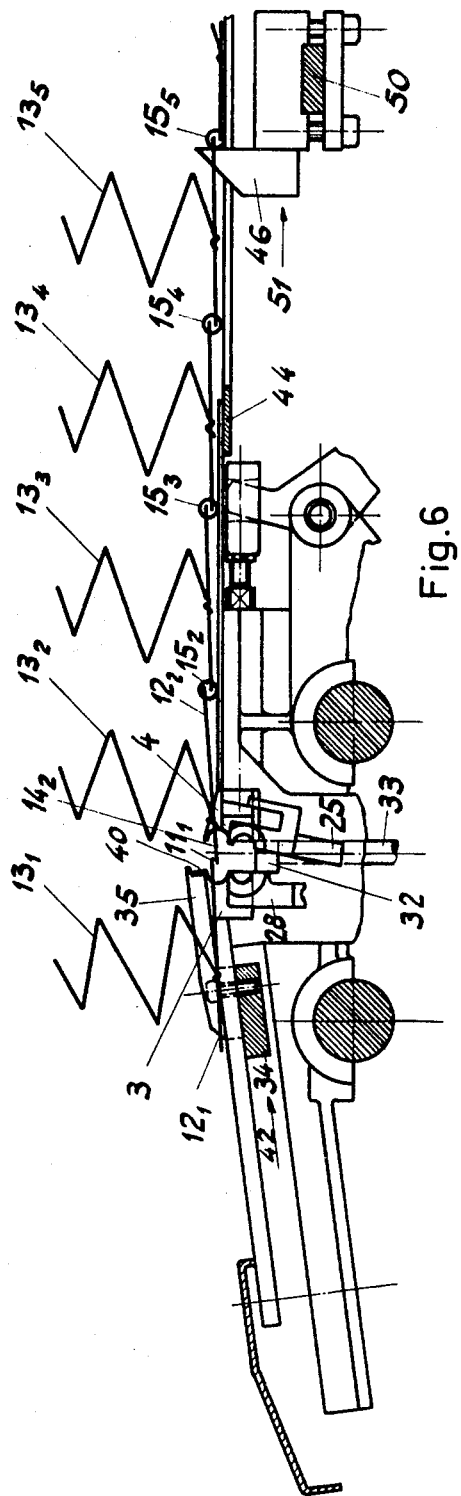

The feed movements of the traverses 34 and 50 now take place in the direction of the arrows 42 and 51, so that the traverses 34 and 50 come into the position shown in FIG. 6. The rear portion $14_2$ of the lower end convolution $12_2$ of the spring $13_2$ is thus engaged by the concave narrow side 40 of the centering cam 35, and the entire spring body manufactured to this stage is pushed to the rear on the table 40. The displacement of the spring body is assisted by the dragging member 46 which draws the spring interior to the rear by the wire spiral $15_5$. The thrust exerted by the centering cams 35 is sufficient for the further conveying of the spring body. The dragging member 46 is provided because, when the spring interior has been manufactured from the desired number of rows of springs and no new rows of springs are connected thereto, no more springs are located in the positions of the springs $13_2$ in FIG. 5 after the extracting movement of the extractor 32, so that, in the absence of the dragging member 46, the spring interior would have to be conveyed further manually. After the wire spiral $15_2$ has been pushed across the jaw 4, the extractor 32 returns to its initial position, so that, in the end position of the traverse 34, the front portion $11_1$ of the end convolution $12_1$ of the spring $13_1$ and the rear portion $14_2$ of the end convolution $12_2$ of the spring $13_2$ fall into the open pair of tongs 3, 4, as illustrated in FIG. 6.

The prismatic body 20 of the wire spiral guiding device 19 is now raised again, and the jaw 4 is returned to its initial position, whereby the wire spiral guide jaw 18 is also closed via the projection 17 of the tong jaw 4. While the loading traverse 34 is returning to its initial position, a wire spiral manufacturing device (not illustrated) commences to manufacture the next wire spiral and screw it through the wire spiral guide passage 30 and the closed pair of tongs 3, 4, in order to join the portions $11_1$ and $14_2$ together. After all the parts have returned to their initial positions of FIGS. 1 and 2, and the loading device 34, 35 has been loaded, the next operating cycle for connecting the next row of springs may be initiated by actuating the pedal.

The machine described not only allows a far more rapid change-over from one size of spring to another, but also a more rapid operation and the application of the loading device for the first two rows of a new spring interior, since the lowered position of the wire spiral guiding device 19 during the feed movement of the loading device 34, 35 ensures that the springs are always accurately received by the pair of tongs 3, 4. This would not be the case if the wire spiral guide were fixedly connected in series with the tongs, since the springs of the first row laid in are not yet connected to a previous row by a wire spiral when the next row is laid in, the springs of the first row therefore lying loosely in the tongs, so that they would stick in a fixed guide during the further conveying by the centering cams 35.

I claim:

1. In a machine for manufacturing spring interiors the combination comprising, a pair of tongs, loading means for feeding overlapped convolutions of coil springs into said pair of tongs, means for feeding a wire spiral between said tongs to connect together the overlapped convolutions of the coil springs located therein, traverse means for supporting and moving said loading means, said loading means including a cam on said traverse means corresponding to said pair of tongs for centering the end convolution of a coil spring during advancement thereof towards the pair of tongs and each cam having a shape for fitting within the end convolution of the coil spring and including a convex rear portion for engaging the convolution at the rear thereof along a substantial length, said rear portion being conically chamfered along its thickness, said cam including a concave convolution at the front thereof at two transversely spaced locations while the remainder of the concave front portion receives the convolution of the preceding coil spring whereby the convolutions are centered and guided by the cam as the coil spring is being advanced, said cam being replaceable for different size convolutions of springs.

2. A machine as claimed in claim 1, wherein said traverse means is removable and said cam is replaced by removal of said traverse means.

References Cited

UNITED STATES PATENTS

| | | | |
|---|---|---|---|
| 1,905,459 | 4/1933 | Gail | 140—92.8 |
| 2,231,744 | 2/1941 | Zimmerman | 140—92.94 |
| 2,262,994 | 11/1941 | Dickey | 140—92.94 |
| 2,294,707 | 9/1942 | Zimmerman | 140—92.8 |
| 2,296,878 | 9/1942 | Saval | 140—92.8 |
| 2,470,812 | 5/1949 | Guaci et al. | 140—92.94 |
| 2,663,038 | 12/1953 | Gail | 140—92.8 |
| 3,045,714 | 7/1962 | Greeno et al. | 140—92.94 |
| 3,064,693 | 11/1962 | Spühl | 140—92.7 |
| 3,098,510 | 7/1963 | Spühl | 140—92.8 |
| 3,339,593 | 9/1967 | Krakauer et al. | 140—92.8 |

CHARLES W. LANHAM, Primary Examiner

E. M. COMBS, Assistant Examiner

U.S. Cl. X.R.

140—92.94